US006814505B2

(12) United States Patent
Hara et al.

(10) Patent No.: US 6,814,505 B2
(45) Date of Patent: Nov. 9, 2004

(54) ROLL-FORM IMAGE RECORDING MATERIAL MAGAZINE

(75) Inventors: Yoshio Hara, Kanagawa (JP); Makoto Kawamura, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/644,771

(22) Filed: Aug. 21, 2003

(65) Prior Publication Data

US 2004/0041995 A1 Mar. 4, 2004

(30) Foreign Application Priority Data

Aug. 27, 2002 (JP) ....................................... 2002-246692

(51) Int. Cl.[7] .......................... G03B 17/26; G03B 27/58

(52) U.S. Cl. ......................... 396/512; 396/513; 355/72; 222/453; 242/346

(58) Field of Search ............................. 355/40, 41, 72, 355/75; 396/512, 513; 271/8.1, 278; 242/346; 222/453

(56) References Cited

U.S. PATENT DOCUMENTS

| | | | | | |
|---|---|---|---|---|---|
| 4,084,464 | A | * | 4/1978 | Bowers | 271/278 |
| 4,748,529 | A | * | 5/1988 | Shiba et al. | 242/346 |
| 5,435,499 | A | | 7/1995 | Hirose | |
| 5,510,156 | A | * | 4/1996 | Zhao | 427/534 |
| 6,026,992 | A | * | 2/2000 | Kaefer et al. | 222/453 |
| 6,607,876 | B2 | * | 8/2003 | Elst et al. | 430/567 |
| 2002/0163053 | A1 | * | 11/2002 | Behin et al. | 257/415 |

FOREIGN PATENT DOCUMENTS

| | | | |
|---|---|---|---|
| EP | 0 153 505 | A1 | 9/1985 |
| JP | 63-124050 | A | 5/1988 |
| JP | 2-113241 | A | 4/1990 |
| JP | 6-19525 | B2 | 3/1994 |

OTHER PUBLICATIONS

European Search Report Dec. 10, 2003.

* cited by examiner

*Primary Examiner*—D. Rutledge
(74) *Attorney, Agent, or Firm*—Sughrue Mion, PLLC

(57) ABSTRACT

An image recording material magazine is provided that has a constitution such that a roll-form image recording material rotatably provided within a casing is drawn out through a slot provided along its whole length in the longitudinal direction with a resilient plate having a force pressing it so as to close the slot and with a cloth member abutting against the plate, the plate being fixed to a support part, which is provided within the magazine in the vicinity of the slot, at an angle that allows a force pressing the material in its thickness direction to be generated when the material is drawn out. The plate is formed from a polyolefin based resin plastic sheet having a water absorption of 0.01 wt % or less, has its surface embossed, and has its tip portion formed with a curved surface so that the embossed surface abuts against the image recording material.

10 Claims, 3 Drawing Sheets

ROLL-FORM IMAGE RECORDING MATERIAL MAGAZINE

BACKGROUND OF THE INVENTION

1. Field of the Invention

The present invention relates to a roll-form image recording material magazine.

2. Description of the Related Art

JP-B-6-19525 (JP-B denotes a Japanese examined patent application publication) discloses, with regard to a method for shielding from light an outlet slot part of a magazine housing a roll-form light-sensitive material, a structure in which the magazine is equipped with a resilient plate formed from a light-shielding plastic film or metal film having a force pressing it so as to close the outlet slot. This resilient plate has its tip portion formed into a curved surface abutting against the light-sensitive material and is formed as a smooth surface so as not to scratch the light-sensitive material. It is disclosed that the above arrangement brings about a stable light-shielding effect even if the gap of the outlet slot of the magazine varies, and that it exhibits an effect in stabilizing the drawing resistance.

When a general light-insensitive image recording material is housed in this magazine, this structure of course exhibits an effect in preventing the roll-form image recording material from being scratched and an effect in stabilizing the drawing resistance. In the case where the magazine is used with a roll-form image recording material, specifically, a 175 μm PET base has been used as the resilient plate in practice, but the resilient plate adheres to the image recording material under high humidity conditions (25° C. 85% RH×4 days), thus causing problems such as image defects on the image recording material and high drawing resistance.

BRIEF SUMMARY OF THE INVENTION

An object of the present invention is to provide a roll-form image recording material magazine that prevents adhesion to a roll-form image recording material and reduces the drawing resistance when the roll-form image recording material is drawn out.

The above object can be attained by the following means.

An image recording material magazine comprising a casing having a slot, a roll-form image recording material rotatably provided in the casing so as to be drawn out through the slot, a resilient plate, a cloth member abutting against the resilient plate, the resilient plate and the cloth member being provided along the whole length of the slot in the longitudinal direction, and the resilient plate having a force pressing it so as to close the slot, and a support part provided within the magazine in the vicinity of the slot, the resilient plate being fixed to the support part at an angle that allows a force pressing the image recording material in its thickness direction to be generated when the image recording material is drawn out, wherein the resilient plate is formed from a polyolefin based resin plastic sheet having a water absorption of 0.01 wt % or less, has its surface embossed, and has its tip portion formed with a curved surface so that the embossed surface abuts against the image recording material.

BRIEF DESCRIPTION OF THE SEVERAL VIEWS OF THE DRAWINGS

A preferred embodiment of the present invention is explained by reference to drawings.

DETAILED DESCRIPTION OF THE INVENTION

Figure 1:
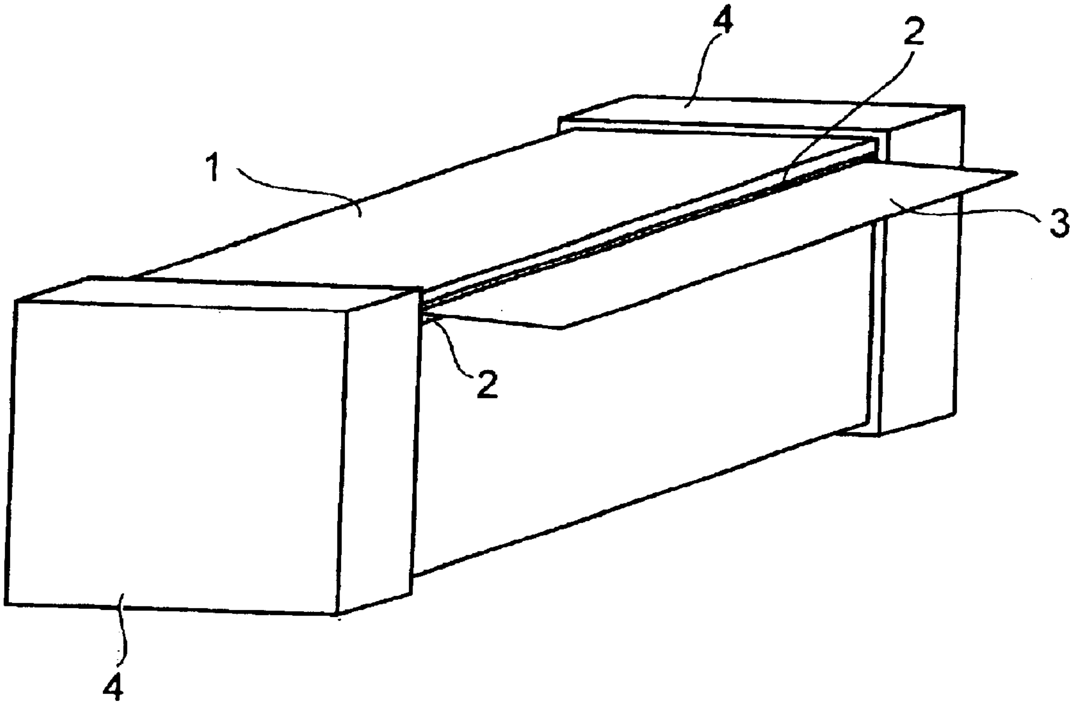
FIG. 1 is a perspective view of a roll-form image recording material magazine (hereinafter, also simply called a 'magazine'), which is one embodiment of the present invention.
Figure 2:
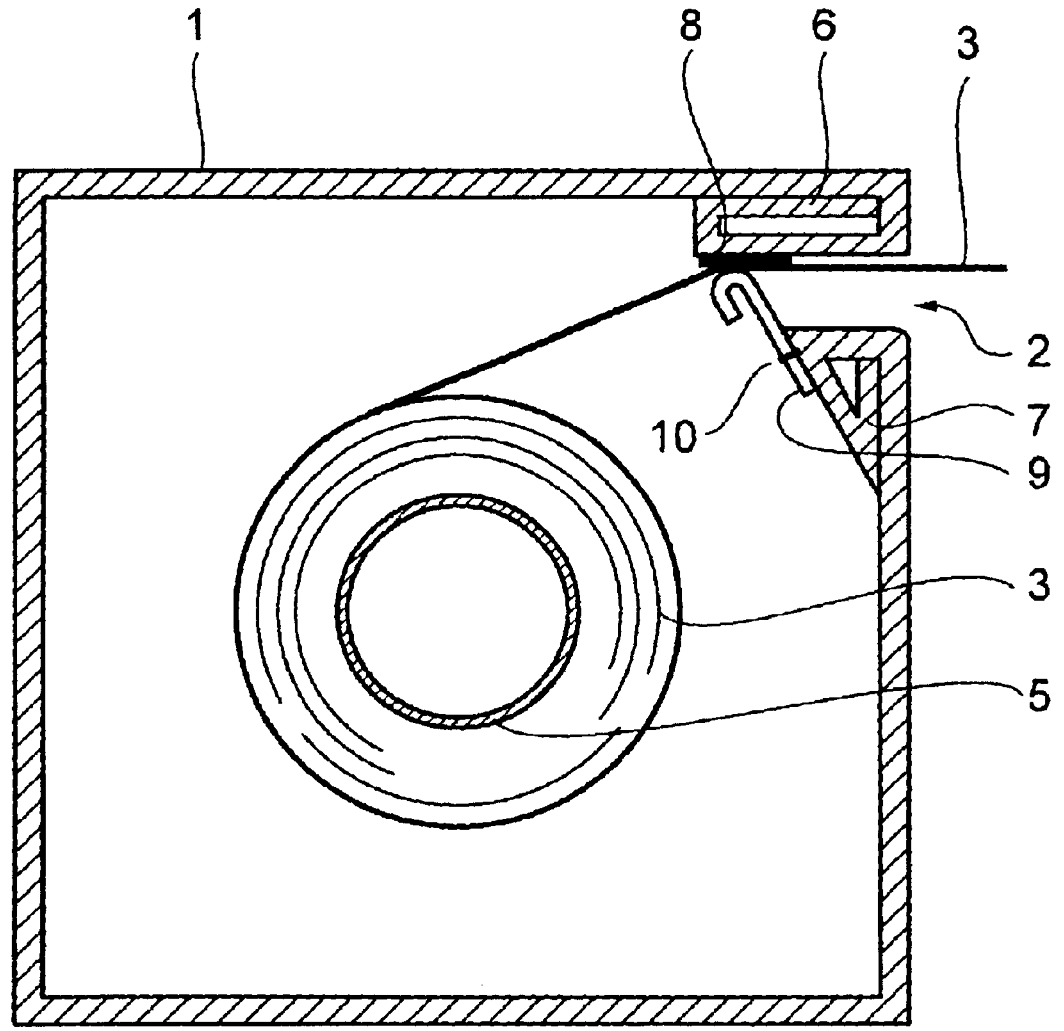
FIG. 2 is a cross-sectional view of the magazine.
Figure 3:
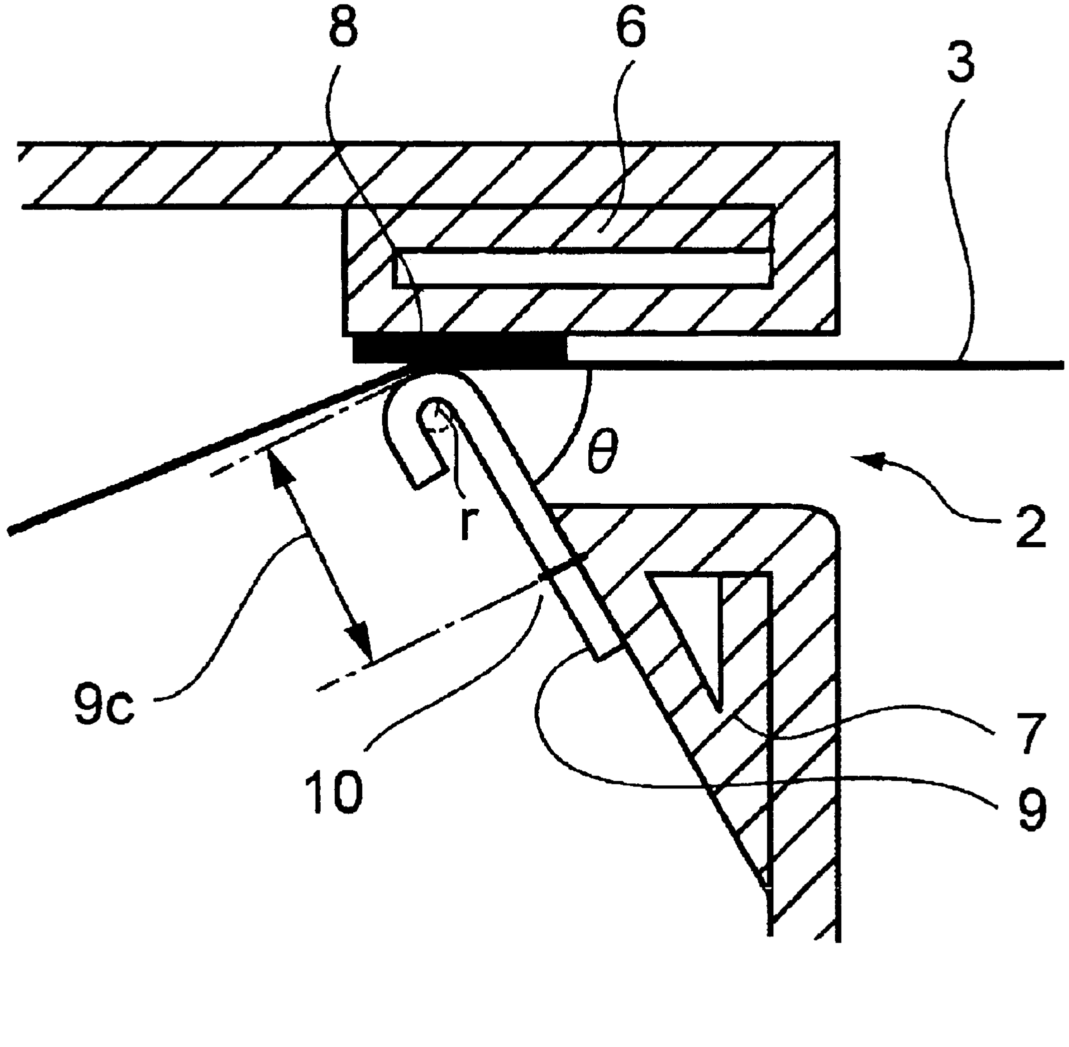
FIG. 3 is an enlarged cross-sectional view of a slot.

The magazine of the present invention is a magazine for an image recording material in which a long length of roll-form image recording material 3 is housed within a casing comprising a square tube-shaped body portion 1 and two end caps 4 sealing opposite ends of the body portion 1, and the image recording material 3 is drawn out through a slot 2 comprising a resilient plate 9 and an upper lip 6 provided in one corner of the body portion 1 so as to extend along the whole axial dimension of the body portion 1 (a direction along a spool 5).

The upper lip 6 of the slot 2 is of a conventional type in which a cloth member 8 is applied to a lip surface, whereas on the entire length of the surface opposite to the cloth member 8 there is provided the resilient plate 9, which has a substantially U-shaped cross section and is fixed to an inclined surface of a support part 7 inside the magazine. The cloth member 8 preferably has resilience. An upper part of the resilient plate 9 is formed into a curved surface having an appropriate curvature and is, for example, bent into an U-shape, so that there is no hindrance when the image recording material 3 is drawn out. The support part 7 may be in various configurations such as one in which it is integrally formed with the body portion 1, one in which it is formed by bending the body portion 1, one in which it is separate from the body portion 1, and one in which it is integral with the resilient plate 9.

The above-mentioned curved surface has an appropriate roundness, and is set in a state in which the image recording material 3 is pressed toward the cloth member 8 with an appropriate pressure. That is, since the resilient plate 9 is provided, as shown in the drawings, at a comparatively large angle toward the direction in which the image recording material 3 moves, the image recording material 3 is pressed so as to sink slightly into the cloth member 8. Furthermore, while the resilient plate 9 abuts against the image recording material 3 at the above-mentioned angle, when this image recording material 3 is drawn out of the magazine, this curved surface receives a force in the direction in which the image recording material is drawn out so that the curved surface is dragged by the image recording material. This force makes a portion of the resilient plate 9 that projects from the support part 7 rotate in the drawing-out direction, thus causing an appropriate pressure to push the curved part further toward the upper lip 6.

The resilient plate 9 in the present invention is formed from a polyolefin based resin plastic sheet having an water absorption of 0.01 wt % or less. The water absorption in the present invention is a value measured in accordance with ASTM D570. If the water absorption exceeds 0.01 wt %, there are the problems that the image recording material and the resilient plate adhere to each other and the drawing resistance when drawing out the image recording material is high when the magazine of the present invention is used under high humidity conditions.

Examples of the polyolefin based resin used in the present invention include polyolefin resins such as various polyethylene resins (PE), various polypropylene resins (PP), and polybutene resins; propylene/ethylene copolymer resins, copolymer resins having ethylene as the main component, copolymer resins having propylene as the main component, cross-linked polyolefin resins, and blends of one or two or more of the above resins. The polyethylene resins and the polypropylene resins are preferable, and the polypropylene resins are particularly preferable.

The water absorptions of polyethylene resins and polypropylene resins measured in accordance with ASTM D570 are described in 'Hoso Gijutsu Binran (Packaging Technology Handbook)' Published by the Japan Packaging Institute, Jul. 1, 1995, First Edition, First Printing, Table 3.40 on p. 437.

The resilient plate 9 of the present invention is embossed so as to impart unevenness to the surface thereof. General embossing is carried out using a known embosser by heating and softening a polyolefin based resin plastic sheet and subjecting it to pressure-printing by means of an embossing roll and a rubber roll. Specific procedures are described in 'Purasuchikku Kako Gijutsu Binran (Shinpan) (Plastic Processing Technology Handbook (New Edition))' Ed. by the Plastic Processing Technology Handbook Editorial Committee, Published by The Nikkan Kogyo Shimbun, Ltd., Dec. 5, 1969, pp. 366 –367.

Embossed polyolefin based resin plastic sheets that can be used in the present invention are commercially available from, for example, Sekisui Seikei, Ltd., Achilles Co., Ltd., and Sheedom Co., Ltd.

An upper part of the resilient plate 9 is formed into a curved surface having an appropriate curvature and is bent into, for example, a U-shape, with the embossed surface facing outside so that, as described above, there is no hindrance when the image recording material 3 is drawn out. The radius r of curvature of the U-shaped curved surface is preferably 0.2 to 1.0 mm.

Furthermore, the resilient plate 9 is fixed to the inclined surface of the support part of the slot on the inner side of the magazine at an angle that generates a force such that the curved surface presses the image recording material in its thickness direction when the image recording material is drawn out.

The pressing force is adjusted so that the drawing resistance is 1.96 to 5.88 N/210 mm by changing the length of the free end, the thickness, or the modulus of elasticity of the resilient plate 9. The drawing resistance referred to in the present invention means the resistance when the image recording material is drawn out, for example, during automatic drawing-out by an image formation device, etc. In order to carry out stable image formation, it is preferable to maintain a low resistance, and variations in which the resistance increases under the conditions of the application environment are undesirable.

In the present invention, a length 9*c* of the free end of the resilient plate 9 is preferably 10 to 30 mm. Its thickness is preferably 0.10 to 0.50 mm. Its Young's modulus is preferably 700 to 2,700 MPa. The angle $\theta$ at which the resilient plate 9 and the upper lip 6 make contact with each other is preferably 40 to 70 degrees. The Young's modulus is a value in accordance with JIS K 7127. The length 9*c* of the free end of the resilient plate 9 refers to a length from a sewing thread-fixed part 10 to the tip of the curved surface of the resilient plate 9.

The cloth member is bonded to an inner side of the upper lip of the slot that receives the pressure from the curved surface. The cloth member preferably has resilience, and the resilience may be of a degree such that the U-shaped tip of the resilient plate 9 can sink thereinto. Examples of the cloth member of the present invention include polyester plush (also known as teremp) and unwoven cloth. In order to maintain a low drawing resistance for the image recording material, it is preferable to use the polyester plush.

The resilient plate 9 is fixed to the support part 7 of the body portion 1. With regard to a method for fixing the resilient plate 9 to the body portion 1, any method can be employed, and specifically it can be affixed using double-sided tape, bonded using a hot-melt adhesive, sewn by thread using a sewing machine, etc. In the present invention, the method in which it is sewn by thread using a sewing machine can be preferably used.

A lubricant may be added to the polyolefin based resin plastic sheet in order to stabilize the drawing resistance of the image recording material. For example, lubricants disclosed in paragraphs 0070 –0085 of JP-A-8-254793 (JP-A denotes a Japanese unexamined patent application publication) can be added.

Moreover, in order to prevent the attachment of dust and the buildup of static between the plastic sheet and the recording material, an antistatic agent may be added. For example, antistatic agents disclosed in paragraphs 0169 –0184 of JP-A-8-254793 can be added.

As the material for the body portion 1, for example, cardboard, base paper, or a plastic is used. In the case of cardboard and base paper, it can be assembled by bending, and in the case of a plastic, it can be assembled by profile die extrusion molding or bending.

In the present invention, E-flute cardboard comprising a liner having a basis weight of 130 g/m$^2$ and a core having a basis weight of 130 g/m$^2$ are preferably used.

The shape of the magazine is preferably a square tube, but the present invention is not limited thereto, and it is of course possible for it to be a circular tube.

The two end caps 4 for sealing opposite ends of the body portion 1 are preferably molded from a plastic since the end caps 4 have a structure (not illustrated) that includes a channel that engages with an edge of the body portion 1 and a bearing for the rotating shaft of the spool 5 around which the image recording material 3 to be housed within the magazine is wound, have a comparatively complicated structure with projections and depressions, and are required to have appropriate rigidity and precise dimensions.

The above explanation relates to a magazine loaded with a general image recording material, and with regard to a magazine for loading with a light-sensitive image recording material, light-shielding properties are of course required, and each member forming the magazine preferably has light-shielding properties. For example, as the material for the body portion 1 a material to whose surface black printing having light-shielding properties has been applied or a material itself kneaded with carbon black is preferably used. The resilient plate 9 also preferably uses a material to whose surface black printing having light-shielding properties has been applied or a black material obtained by kneading a resilient material with carbon black. Furthermore, it is preferable to use a black cloth member having light-shielding properties as the cloth member 8 bonded to the upper lip of the magazine and, for example, a light-shielding plush member, which is usually used in the slit of a 135 size cartridge. A material kneaded with carbon black is also preferably used for the end caps 4. In this way, a magazine for loading with a light-sensitive image recording material may have a constitution such that the entire magazine can maintain light-shielding properties.

In the present invention, for example, a magazine package can be made by winding a roll-form image recording material having a width of 210 mm and a length of 31 m around a 3 inch paper tube, loading it in the magazine, and closing the opposite ends of the magazine with the end caps 4.

The image recording material referred to in the present invention is not particularly limited, and the present invention can be applied to all image recording materials, including light-sensitive materials and image receiving paper for heat-developable light-sensitive materials used in prints, printing, duplicating, etc. The light-sensitive materials are not limited to silver halide light-sensitive materials (including heat-developable light-sensitive material), but all materials such as various types of light-sensitive material films and printing papers can be used.

In accordance with use of the roll-form image recording material magazine of the present invention, it becomes possible to prevent adhesion to a roll-form image recording material and reduce the drawing resistance when drawing out the roll-form image recording material.

EXAMPLES

The present invention is explained further in detail by reference to Examples, but the present invention is not limited by these examples.

An image recording material magazine shown in FIG. 1 was made under conditions such that the body portion 1 and the resilient plate 9 were fixed so as to have a radius of curvature of the U-shaped curved surface of 0.5 mm, a length of the free end after fixing of 20 mm, and an angle θ of 52 degrees, and after allowing it to stand at 25° C. and 85% RH for 4 days, an evaluation of the drawing-out of an image recording material was carried out. The water absorption was measured in accordance with ASTM D570. The material of each constituent member and the evaluation results are shown below.

Body Portion 1

E-Flute cardboard (liner basis weight 130 g/m$^2$, core basis weight 130 g/m$^2$)

Resilient Plate 9

PP embossed sheet: PP embossed sheet (PL-F3-N) manufactured by Sekisui Seikei Ltd., water absorption 0.01 wt % or less, thickness 0.38 mm, Young's modulus 900 MPa.

PP sheet: standard PP sheet manufactured by Sekisui Seikei Ltd., water absorption 0.01 wt % or less, thickness 0.38 mm, Young's modulus 900 MPa.

PET embossed sheet: PET embossed sheet manufactured by Toray Industries, Inc., water absorption 0.3 wt %, thickness 0.18 mm, Young's modulus 2,600 MPa.

PET sheet: ordinary PET sheet manufactured by Fuji Photo Film Co., Ltd., water absorption 0.3 wt %, thickness 0.18 mm, Young's modulus 2,600 MPa.

Cloth Member 8

Polyester plush

Image Recording Material 3

Heat-developable recording materials (Pictrostat, Pictrography, etc. manufactured by Fuji Photo Film Co., Ltd., wound around the spool 5 with the image-receiving surface inside)

The evaluation results are given in Table 1.

TABLE 1

| | Adhesion to image recording material | Influence on image recording material | Drawing resistance (N/210 mm) |
|---|---|---|---|
| PP embossed sheet | No | No | 4.41 |
| PP sheet | Yes | Yes | 5.39 |
| PET embossed sheet | Slight | Slight | 5.39 |
| PET sheet | Yes | Yes | 5.88 |

What is claimed is:

1. An image recording material magazine comprising:

a casing having a slot;

a roll-form image recording material rotatably provided in the casing so as to be drawn out through the slot;

a resilient plate;

a cloth member abutting against the resilient plate, the resilient plate and the cloth member being provided along the whole length of the slot in the longitudinal direction, and the resilient plate having a force pressing it so as to close the slot; and a support part provided within the magazine in the vicinity of the slot, the resilient plate being fixed to the support part at an angle that allows a force pressing the image recording material in its thickness direction to be generated when the image recording material is drawn out;

wherein the resilient plate is formed from a polyolefin based resin plastic sheet having a water absorption of 0.01 wt % or less, has its surface embossed, and has its tip portion formed with a curved surface so that the embossed surface abuts against the image recording material.

2. The magazine according to claim 1 wherein the casing comprises a square tube-shaped body portion and two end caps for sealing opposite ends of the body portion, the cloth member has resilience and is bonded to an inner side of an upper lip of the slot that receives the pressure from the resilient plate, and a curved surface formed at a tip portion of the resilient plate has a U-shape.

3. The magazine according to claim 1 wherein the polyolefin based resin is a polyethylene resin or a polypropylene resin.

4. The magazine according to claim 2 wherein the U-shaped curved surface of the resilient plate has a radius of curvature of 0.2 to 1.0 mm.

5. The magazine according to claim 1 wherein the resilient plate has a free end length of 10 to 30 mm.

6. The magazine according to claim 1 wherein the resilient plate has a thickness of 0.10 to 0.50 mm.

7. The magazine according to claim 1 wherein the resilient plate has a Young's modulus of 700 to 2,700 MPa.

8. The magazine according to claim 2 wherein the angle θ at which the resilient plate and the upper lip of the slot make contact with each other is 40 to 70 degrees.

9. The magazine according to claim 1 wherein the cloth member is a polyester plush.

10. The magazine according to claim 1 wherein the end cap is molded from a plastic.

* * * * *